US009988571B2

(12) United States Patent
Salazar et al.

(10) Patent No.: US 9,988,571 B2
(45) Date of Patent: Jun. 5, 2018

(54) SURFACTANT FORMULATION FOR RELEASE OF UNDERGROUND FOSSIL FLUIDS

(71) Applicant: Huntsman Petrochemical LLC, The Woodlands, TX (US)

(72) Inventors: Luis C. Salazar, Spring, TX (US); David C. Lewis, Conroe, TX (US); Guy Biesmans, Everberg (BE); Srinivasa S. Godavarthy, Zachary, LA (US); Farron W. Miller, Tomball, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 120 days.

(21) Appl. No.: 14/399,417

(22) PCT Filed: Sep. 12, 2013

(86) PCT No.: PCT/US2013/059350
§ 371 (c)(1),
(2) Date: Nov. 6, 2014

(87) PCT Pub. No.: WO2014/055213
PCT Pub. Date: Apr. 10, 2014

(65) Prior Publication Data
US 2015/0129228 A1  May 14, 2015

Related U.S. Application Data

(60) Provisional application No. 61/708,268, filed on Oct. 1, 2012, provisional application No. 61/816,253, filed on Apr. 26, 2013.

(51) Int. Cl.
*C09K 8/584* (2006.01)
*E21B 43/16* (2006.01)
*C09K 8/524* (2006.01)

(52) U.S. Cl.
CPC .............. *C09K 8/584* (2013.01); *C09K 8/524* (2013.01); *E21B 43/16* (2013.01)

(58) Field of Classification Search
CPC .......... C09K 8/584; C09K 8/588; C09K 8/68; C09K 8/58; C09K 2208/10; C09K 8/685; C09K 8/88; C09K 8/52; C09K 8/74; C09K 8/882; C09K 2208/22; C09K 8/602; C09K 8/70; C09K 8/92; C09K 8/94; C09K 2208/08; C09K 2208/20; C09K 2208/24; C09K 2208/26; C09K 2208/28; C09K 8/035; C09K 8/38; C09K 8/516; C09K 8/536; C09K 8/54; C09K 8/60; C09K 8/703; C09K 8/706; C09K 8/887; C09K 2208/12; C09K 2208/30; C09K 8/00; C09K 8/032; C09K 8/518; C09K 8/524; C09K 8/582; C09K 8/594; C09K 8/62; C09K 8/86; C09K 2208/32; C09K 8/04; C09K 8/12; C09K 8/50; C09K 8/502; C09K 8/514
See application file for complete search history.

(56) References Cited

U.S. PATENT DOCUMENTS

| 3,811,504 | A | | 5/1974 | Flournoy et al. | |
|---|---|---|---|---|---|
| 3,811,507 | A | | 5/1974 | Flournoy et al. | |
| 3,890,239 | A | | 6/1975 | Dycus et al. | |
| 4,293,428 | A | * | 10/1981 | Gale ...................... | C09K 8/584 166/270.1 |
| 4,426,303 | A | * | 1/1984 | Nuckels .............. | B01F 17/0085 166/275 |
| 4,463,806 | A | | 8/1984 | Hurd | |
| 4,699,214 | A | * | 10/1987 | Angstadt ................... | C07C 2/68 166/303 |
| 5,973,195 | A | | 10/1999 | Lange et al. | |
| 6,448,213 | B1 | | 9/2002 | Willman | |
| 6,743,764 | B1 | * | 6/2004 | Wallick ..................... | C11D 1/24 252/182.3 |
| 7,629,299 | B2 | | 12/2009 | Berger et al. | |
| 8,459,360 | B2 | | 6/2013 | Pope et al. | |
| 2004/0177958 | A1 | * | 9/2004 | Shpakoff ................ | C09K 8/584 166/270.1 |
| 2005/0199395 | A1 | | 9/2005 | Berger et al. | |

(Continued)

FOREIGN PATENT DOCUMENTS

| EP | 0032072 | * | 7/1981 |
|---|---|---|---|
| WO | 1999019436 | | 4/1999 |

(Continued)

OTHER PUBLICATIONS

The Dow Chemical Company Dowfax Anionic Surfactants: Discover the Power of a Unique Disulfonated Structure for the Toughest Applications, (Jul. 2000), p. 1-3.*
The Dow Chemical Company, Dowfax Anionic Surfactants: Discover the Power of a Unique Disulfonated Structure for the Toughest Applications, Jul. 2010, p. 1-3.
International Searching Authority (US), International Search Report in PCT/US2013/059350, dated Sep. 12, 2013, 4 pages, Alexandria, VA, United States of America.
International Searching Authority (US), Written Opinion in PCT/US2013/059350, dated Sep. 12, 2013, 5 pages, Alexandria, VA, United States of America.

(Continued)

*Primary Examiner* — Kumar R Bhushan
(74) *Attorney, Agent, or Firm* — Huntsman Petrochemical LLC; Edward Korompai

(57) ABSTRACT

The present disclosure provides a surfactant formulation for use in treating and recovering fossil fluid from a subterranean formation. The surfactant formulation includes a primary surfactant, a formulation stability agent and injection water. The surfactant formulation may be injected into one or more injection wells located within the subterranean formation and fossil fluids can then be subsequently recovered from one or more producing wells.

11 Claims, No Drawings

(56) References Cited

U.S. PATENT DOCUMENTS

| | | | |
|---|---|---|---|
| 2006/0185845 A1 | 8/2006 | Shpakoff et al. | |
| 2007/0191633 A1 | 8/2007 | Berger et al. | |
| 2008/0196893 A1* | 8/2008 | Berger | C09K 8/602 166/270.1 |
| 2008/0200565 A1* | 8/2008 | Harwell | C09K 8/524 514/785 |
| 2009/0270281 A1 | 10/2009 | Steinbrenner et al. | |
| 2010/0185039 A1* | 7/2010 | Hoag | B09C 1/00 588/320 |
| 2011/0046024 A1 | 2/2011 | Campbell et al. | |
| 2011/0048721 A1 | 3/2011 | Pope et al. | |
| 2011/0059872 A1* | 3/2011 | Weerasooriya | C09K 8/584 507/219 |
| 2011/0190174 A1 | 8/2011 | Weerasooriya et al. | |
| 2011/0220365 A1* | 9/2011 | Bittner | B01F 17/0057 166/369 |
| 2012/0055668 A1 | 3/2012 | Wu et al. | |
| 2012/0220502 A1 | 8/2012 | Juergenson et al. | |

FOREIGN PATENT DOCUMENTS

| | | | |
|---|---|---|---|
| WO | 1999047496 | | 9/1999 |
| WO | WO 99/047496 | * | 9/1999 |
| WO | WO99/047496 | * | 9/1999 |
| WO | 2011028930 | | 3/2011 |

OTHER PUBLICATIONS

Wang Shiyong, et al., Surfactant Chemistry, Chemical Industry Press, pp. 72-74, published Sep. 2005.

Zhang Guanghua, Guidelines for the preparation and application of water treatment chemicals, China Petrochemical Press, p. 253, published in Oct. 2003.

Russian Patent Application 2014141374 Office Action dated May 22, 2017.

* cited by examiner

SURFACTANT FORMULATION FOR RELEASE OF UNDERGROUND FOSSIL FLUIDS

CROSS-REFERENCE TO RELATED APPLICATIONS

This application is the National Phase of International Application PCT/US2013/059350 filed Sep. 12, 2013 which designated the U.S. and which claims priority to U.S. App. Ser. No. 61/708,268 filed Oct. 1, 2012 and U.S. App. Ser. No. 61/816,253 filed Apr. 26, 2013. The noted applications are incorporated herein by reference.

FIELD OF THE INVENTION

The present disclosure is directed to surfactant formulation containing a primary surfactant, a formulation stability agent and injection water and to a process for recovering fossil fluids from subterranean reservoirs employing such surfactant formulations.

BACKGROUND INFORMATION

Fossil fluids are generally recovered from underground formations by penetrating the formation with one or more wells and pumping or permitting the fossil fluid to flow to the surface through the well. In primary recovery, a natural driving energy such as an underlying active water drive or a gas under some minimum pressure may possess sufficient pressure to drive the fluid to the well and then the surface. In many instances, the natural driving energy is insufficient or becomes insufficient to cause the fluid to flow to the well. Thus, a substantial portion of the fossil fluid to be recovered can remain in the formation after depletion of the natural driving energy. In such cases, various secondary or tertiary recovery techniques must be applied to recover the remaining fluid.

One such technique involves the injection of water through one or more injection wells to drive the residual fluid towards a producing well. When the injection of water no longer results in acceptable rates of production, the producing well must either be abandoned or subjected to other processes to further increase extraction. A variety of processes are known including steam flooding, polymer flooding, alkali flooding, miscible flooding with carbon dioxide, and flooding with aqueous surfactant solutions. With respect to flooding with an aqueous surfactant solution, a surfactant package is added to the injection water and injected into the well for the purpose of decreasing the interfacial tension between the injection water and fossil fluid phases thus leading to an increase in fossil fluid extraction. The challenge one skilled in the art faces when implementing such a process is determining an effective combination of components which make up the surfactant package. Many combinations must generally be tried before a suitable surfactant package can be formulated having good tolerance towards the multivalent cations found in the brine of many formations as well as having low adsorption onto rock of the formation. For example:

U.S. Pat. No. 3,811,504 discloses the use of a three surfactant system containing an alkyl sulfate, an alkyl polyethoxylated sulfate, and a polyethoxylated alkylphenol;

U.S. Pat. No. 3,890,239 discloses a surfactant composition useful in recovering oil from a formation that includes an organic sulfonate, a sulfated or sulfonated oxyalkylated alcohol and a polyalkylene glycol alcohol ether;

U.S. Pat. No. 4,463,806 discloses a surfactant package containing a water-soluble ether-linked sulfonate, an alcohol and a petroleum sulfonate or alkylbenzene sulfonate;

U.S. Pat. No. 7,629,299 discloses the use of alcohol ether sulfonates derived from unsaturated alcohol ethers;

U.S. Pat. Publ. No. 2005/01999395 discloses the use of an alkali and an alkylaryl sulfonate surfactant derived from alpha-olefins for recovering oil from a formation;

U.S. Pat. Publ. No. 2006/0185845 discloses a composition that includes an aliphatic anionic surfactant and an aliphatic nonionic additive for use in treating a formation;

U.S. Pat. Publ. No. 2007/0191633 discloses a blend or recovering oils that contains water or brine, an alcohol or alcohol ether and a bifunctional anionic surfactant;

U.S. Pat. Publ. No. 2009/0270281 discloses a surfactant mixture including a hydrocarbon radical having 12-30 carbons and a branched hydrocarbon having 6 to 11 carbon atoms for use in tertiary oil extraction;

U.S. Pat. Publ. No. 2011/0046024 discloses the use of an alkylated hydroxyaromatic sulfonate, a solvent, a passivator and a polymer for recovering oil from a formation;

U.S. Pat. Publ. No. 2011/0048721 discloses the use of high molecular weight sulfated internal olelfin sulfonate sulfates and high molecular weight dialkylphenol alkoxylate sulfonate sulfates for use in oil recovery; and U.S. Pat. Publ. No. 2011/0190174 discloses tristyrylphenol alkoxylate sulfates and their use as a surfactant in oil recovery applications.

Because of the numerous surfactants available for use, there is a need in the art for cost effective methods for determining new surfactant packages useful in the recovery of fossil fluids, especially under high salinity and high temperature conditions. Provided herein are methods and surfactant formulations addressing the needs in the art.

SUMMARY OF THE INVENTION

The present disclosure relates to a surfactant formulation for treating a fossil fluid-bearing subterranean formation comprising a primary surfactant, a formulation stability agent selected from the group consisting of a booster molecule, a dialkyl sulfosuccinate, a solvent and a mixture thereof and injection water.

In a further embodiment, the present disclosure provides a process for preparing a surfactant formulation for use in treating a fossil fluid-bearing subterranean formation by combining a primary surfactant with a formulation stability agent selected from the group consisting of a booster molecule, a dialkyl sulfosuccinate, a solvent and a mixture thereof and injection water.

In a still further embodiment, the present disclosure provides a process for the recovery of fossil fluids from a subterranean formation by injecting a surfactant formulation containing a primary surfactant, a formulation stability agent selected from the group consisting of a booster molecule, a dialkyl sulfosuccinate, a solvent and a mixture thereof and injection water into one or more injection wells located within the subterranean formation and recovering the fossil fluids from one or more producing wells. The injection well and the producing well may be the same well or different wells.

DETAILED DESCRIPTION

If appearing herein, the term "comprising" and derivatives thereof are not intended to exclude the presence of any additional component, step or procedure, whether or not the same is disclosed herein. In order to avoid any doubt, all formulations claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a primary surfactant" means one primary surfactant or more than one primary surfactant.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

For methods of treating a fossil fluid-bearing subterranean formation, the term "treating" includes placing a chemical within the subterranean formation using any suitable manner known in the art, for example, pumping, injecting, pouring, releasing, displacing, spotting, or circulating the chemical into a well, well bore or subterranean formation.

The term "fossil fluids" include oleaginous materials such as those found in oil field deposits, oil shales, tar sands, heavy oil deposits, and the like. The fossil fluids are generally a mixture of naturally occurring hydrocarbons that can be refined into diesel, gasoline, heating oil, jet oil, kerosene and other products called petrochemicals. Fossil fluids derived from subterranean formations may include, but are not limited to, kerogen, bitumen, pyrobitumen, asphaltenes, oils or combinations thereof.

The term "alkyl" is inclusive of both straight chain and branched chain groups and of cyclic groups. Cyclic groups can be monocyclic or polycyclic, and in some embodiments, can have from 3 to 10 carbon atoms.

The term "aryl" includes carbocyclic aromatic rings or ring systems, for example, having 1, 2 or 3 rings and optionally containing at least one heteroatom (e.g. O, S or N) in the ring. Examples of aryl groups include phenyl, naphthyl, biphenyl, fluorenyl, furyl, thienyl, pyridyl, quionlinyl, isoquinlinyl, indoyl, isoindolyl, triazolyl, pyrrolyl, tetrazolyl, imidazolyl, pyrazolyl, oxazolyl, and thiazolyl.

The term "alkylaryl" refers to an aryl moiety to which an alkyl group is attached.

The term "alkali metal" refers to lithium, sodium or potassium.

The term "alkaline earth metal" refers to calcium, barium, magnesium or strontium.

The term "lower carbon chain alcohols" refers to alcohols having no more than 10 carbon atoms.

As used herein, the term "substantially free" means, when used with reference to the substantial absence of a material in a formulation, that such a material is present, if at all, as an incidental impurity or by-product. In other words, the material does not affect the properties of the formulation.

The phrase "subterranean formation" encompasses both areas below exposed earth and areas below earth covered by water, such as an ocean or fresh water. Temperatures in a subterranean formation may range from about 25° F. to about 300° F. In some embodiments, the temperature of the formation is at least about 100° F., in other embodiments the temperature of the formation is at least about 125° F., while in other embodiments, temperature of the formation is at least about 150° F.

The present disclosure generally provides a surfactant formulation for treating and recovering fossil fluids from a subterranean formation, and especially for treating and recovering fossil fluids from a subterranean formation under high salinity and/or high temperature conditions. According to one embodiment, the surfactant formulation includes a primary surfactant, a formulation stability agent and injection water. It has been surprisingly found that the addition of minor amounts of the formulation stability agent to the formulation adds salinity and hardness tolerance to the formulation, especially at high salinity conditions as well as phase stability at high temperature conditions. Moreover, additional components usually found in surfactant compositions, such as co-surfactants, that are generally included to improve stability of the surfactant formulation, can be substantially reduced or eliminated thereby speeding up the process of developing an effective formulation as well as decreasing the cost of the formulation.

As noted above, the surfactant formulation includes a primary surfactant. The primary surfactant can be any compound having a hydrophobic head, a hydrophilic tail and possible intermediate groups. In one embodiment, the primary surfactant comprises a compound having a hydrophobic head that is a natural or synthetically-based alkyl group or an alkylaryl group and a hydrophilic tail that is an alkoxylate group, a sulfate group, a sulfonate group, an ether methylene carboxylate group, a phosphate group, a phosphonate group, a betaine, a sulfobetaine or an amine oxide. The surfactant formulation can comprise one primary surfactant or a mixture of primary surfactants.

According to one embodiment, the primary surfactant comprises an alkylaryl sulfonate. In one particular embodiment, the alkylaryl sulfonate is a compound represented by the formula (I):

(I)

where $R^a$ is hydrogen or an alkyl group containing from 1 to 3 carbon atoms, $R^b$ is hydrogen or an alkyl group containing from 1 to 3 carbon atoms, $R^c$ is an alkyl group having from 8 to 40 carbon atoms and A is a monovalent cation. In one embodiment, A is an alkali metal ion, an ammonium ion or substituted ammonium ion. Examples of substituted ammonium ions include ammonium independently substituted with from 1 to 4 aliphatic or aromatic hydrocarbyl groups having from 1 to 15 carbon atoms.

The compound of formula (I) may be obtained by the alkylation of an aromatic compound. In one embodiment, the aromatic compound is benzene, toluene, xylene or a mixture thereof. For embodiments where the aromatic compound includes xylene, the xylene compound may be ortho-xylene, meta-xylene, para-xylene, or a mixture thereof.

The aromatic compound may be alkylated with a mixture of normal alpha olefins containing from $C_8$ to $C_{40}$, carbons and in some embodiment, $C_{14}$ to $C_{30}$ carbons to yield an aromatic alkylate. The aromatic alkylate is then sulfonated to form an alkylaromatic sulfonic acid which is then neutralized with a source of alkali or alkaline earth metal or ammonia thereby producing an alkylaryl sulfonate compound. In one embodiment, the source is an alkali metal hydroxide, such as, but not limited to, sodium hydroxide or potassium hydroxide.

In another embodiment, the primary surfactant comprises a compound represented by the formula (II):

$$R^d-O-[(CH_2CH(R^e)-O)_r(CH_2CH_2O)_s]-UA \qquad (II)$$

where $R^d$ is an alkyl group containing 6 to 30 carbon atoms, $R^e$ is $CH_3$ or $CH_2CH_3$, r is a number from 0 to 30, s is a number from 0 to 30, U is COO or $SO_4$ and A is defined as above. According to one embodiment, where both r and s are greater than 0, the propylene oxide and/or butylene oxide are present in a molar amount of at least about two times greater than the molar concentration of ethylene oxide.

According to one embodiment, the surfactant formulation comprises from about 0.005 to about 10 weight percent actives of the primary surfactant, based on the total weight of the surfactant formulation. As used herein, the term "actives" refers to the concentration of the monovalent cation salts of each primary surfactant species present. In another embodiment, the surfactant formulation comprises from about 0.01 to about 5 weight percent actives of the primary surfactant, based on the total weight of the surfactant formulation. In still another embodiment, the surfactant formulation comprises from about 0.5 to about 3 weight percent actives of the primary surfactant, based on the total weight of the surfactant formulation.

The surfactant formulation further includes a formulation stability agent selected from the group consisting of a booster molecule, a dialkyl sulfosuccinate, a solvent and a mixture thereof. According to one embodiment, the booster molecule is a compound having a structure as shown in formula (III):

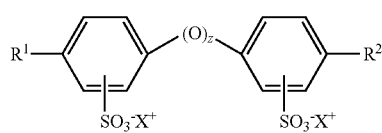

(III)

where z is 0 or 1, $R^1$ and $R^2$ are each independently hydrogen, an alkyl group containing 1 to 18 carbon atoms, or an aryl group, and each X is independently hydrogen, an alkali metal ion, an alkaline earth metal ion or an ammonium ion radical of the formula (IV):

$$(R^3)_3HN^+ \qquad (IV)$$

where each $R^3$ is independently hydrogen, an alkyl group containing 1 to 4 carbon atoms or a $C_1$-$C_4$ hydroxyalkyl radical.

In one embodiment, one or both of $R^1$ and $R^2$ are an alkyl group containing 6 to 16 carbon atoms. In another embodiment, X at each occurrence is sodium or potassium. In still another embodiment, z is 1.

Examples of compounds of the formula (III) include, but are not limited to, disodium hexadecyldiphenyloxide disulfonate; disodium dihexadecyldiphenyloxide disulfonate; sodium dipropyldiphenyleneoxide sulfonate, disodium didecyldiphenylene oxide disulfonate, and disodium mono- and di-sec-hexyldiphenylene oxide disulfonate, as well as their mixtures. Such materials can be readily prepared by a person of ordinary skill in the art, using well known techniques. Suitable procedures are described in U.S. Pat. No. 6,743,764, and references cited therein, which is incorporated herein by reference.

According to one embodiment, the booster molecule is added to the surfactant formulation at a ratio of about 1:15 parts by weight of booster molecule to primary surfactant. In another embodiment, the booster molecule is added to the surfactant formulation at a ratio of about 1:10 parts by weight of booster molecule to primary surfactant. In still another embodiment, the booster molecule is added to the surfactant formulation at a ratio of about 1:7.5 parts by weight of booster molecule to primary surfactant. In yet another embodiment, the booster molecule is added to the surfactant formulation at a ratio of about 1:5 parts by weight of booster molecule to primary surfactant. In a further embodiment, the booster molecule is added to the surfactant formulation at a ratio of about 1:2.5 parts by weight of booster molecule to primary surfactant. In yet a further embodiment, the booster molecule is added to the surfactant formulation at a ratio of about 1:1 parts by weight of booster molecule to primary surfactant.

According to another embodiment, the booster molecule is added to the surfactant formulation at a ratio of between about 1:20 parts by weight of booster molecule to primary surfactant to about 1:1 parts by weight of booster molecule to primary surfactant. In another embodiment, the booster molecule is added to the surfactant formulation at a ratio of about 1:15 parts by weight of booster molecule to primary surfactant to about 1:5 parts by weight of booster molecule to primary surfactant. In still another embodiment, the booster molecule is added to the surfactant formulation at a ratio of about 1:12.5 parts by weight of booster molecule to primary surfactant to about 1:7.5 parts by weight of booster molecule to primary surfactant.

In another embodiment, the formulation stability agent is a dialkyl sulfosuccinate represented by the formula (V):

(V)

where $R^4$ and $R^5$ are each independently an alkyl group containing 5 to 13 carbon atoms and M is an alkali metal ion, an alkaline earth metal ion, an ammonium ion or a substituted ammonium ion. Examples of substituted ammonium ions include ammonium independently substituted with from 1 to 4 aliphatic or aromatic hydrocarbyl groups having from 1 to 15 carbon atoms.

According to one embodiment, $R^4$ and $R^5$ are independently a $C_5$ alkyl, a $C_6$ alkyl, a $C_8$ alkyl or a $C_{13}$ alkyl. These groups may be derived, for example, from respectively, amyl alcohol, methyl amyl alcohol (1,4-dimethyl butyl alcohol), 2-ethyl hexanol, and mixed isomers of alcohols.

In another embodiment, M is an alkali metal ion or alkaline earth metal ion. In a further embodiment, M is sodium.

According to one embodiment, the dialkyl sulfosuccinate is added to the surfactant formulation at a ratio of about 1:15 parts by weight of dialkyl sulfosuccinate to primary surfactant. In another embodiment, the dialkyl sulfosuccinate is added to the surfactant formulation at a ratio of about 1:10 parts by weight of dialkyl sulfosuccinate to primary surfactant. In still another embodiment, the dialkyl sulfosuccinate is added to the surfactant formulation at a ratio of about 1:7.5 parts by weight of dialkyl sulfosuccinate to primary surfactant. In yet another embodiment, the dialkyl sulfosuccinate is added to the surfactant formulation at a ratio of about 1:5 parts by weight of dialkyl sulfosuccinate to primary surfactant. In a further embodiment, the dialkyl sulfosuccinate is added to the surfactant formulation at a ratio of about 1:2.5 parts by weight of dialkyl sulfosuccinate to primary surfactant. In yet a further embodiment, the dialkyl sulfosuccinate is added to the surfactant formulation at a ratio of about 1:1 parts by weight of dialkyl sulfosuccinate to primary surfactant.

According to another embodiment, the dialkyl sulfosuccinate is added to the surfactant formulation at a ratio of between about 0.5:20 parts by weight of dialkyl sulfosuccinate to primary surfactant to about 0.5:1 parts by weight of dialkyl sulfosuccinate to primary surfactant. In another embodiment, the dialkyl sulfosuccinate is added to the surfactant formulation at a ratio of about 0.75:15 parts by weight of dialkyl sulfosuccinate to primary surfactant to about 0.75:1 parts by weight of dialkyl sulfosuccinate to primary surfactant. In still another embodiment, the dialkyl sulfosuccinate is added to the surfactant formulation at a ratio of about 1:12.5 parts by weight of dialkyl sulfosuccinate to primary surfactant to about 1:1 parts by weight of dialkyl sulfosuccinate to primary surfactant.

In another embodiment, the formulation stability agent is a solvent. Examples of suitable solvents include, but are not limited to, alcohols, such as lower carbon chain alcohols, for example, isopropyl alcohol, ethanol, n-propyl, alcohol, n-butyl alcohol, sec-butyl alcohol, n-amyl alcohol, sec-amyl alcohol, n-hexyl alcohol, and sec-hexyl alcohol; lower carbon chain alcohols that have been alkoxylated with ethylene oxide (EO), propylene oxide (PO) or butylene oxide (BO), for example, n-butanol+1EO, n-butanol+2EO, n-butanol+3EO, n-hexanol+6EO, 2-ethylhexanol+2EO and iso-butanol+3EO, alcohol ethers, polyalkylene alcohol ethers, such as ethylene glycol monobutyl ether, polyalkylene glycols, such as ethylene glycol and propylene glycol, poly(oxyalkylene) glycols, such as diethylene glycol, poly(oxyalkylene) glycol ethers, or any mixtures thereof.

In one embodiment, the solvent is added to the surfactant formulation at a ratio of between about 20:1 parts by weight of solvent to primary surfactant to about 1:1 parts by weight of solvent to primary surfactant. In another embodiment, the solvent is added to the surfactant formulation at a ratio of between about 15:1 parts by weight of solvent to primary surfactant to about 2.5:1 parts by weight of solvent to primary surfactant. In still another embodiment, the solvent is added to the surfactant formulation at a ratio of between about 10:1 parts by weight of solvent to primary surfactant to about 5:1 parts by weight of solvent to primary surfactant.

The surfactant formulation also includes injection water. In one embodiment, the injection water may be seawater, brine, fresh water from an aquifer, river or lake, or a mixture thereof. Thus, according to many embodiments, the injection water contains minerals, for example, barium, calcium, magnesium, and/or mineral salts, for example, sodium chloride, potassium chloride, magnesium chloride.

It's well known water salinity and/or water hardness may affect recovery of fossil fluids in a formation. As used herein, "salinity" refers to the amount of dissolved solids in the injection water. Thus, in one embodiment, the injection water has a salinity of at least about 20,000 ppm. In another embodiment, the injection water has a salinity of at least about 30,000 ppm. In still another embodiment, the injection water has a salinity of at least about 50,000 ppm. In still a further embodiment, the injection water has a salinity of at least about 100,000 ppm. In a further embodiment, the injection water has a salinity of at least about 200,000 ppm.

In yet another embodiment, the surfactant formulation may optionally include a chelant, or a polymer.

Examples of chelants which may be used include, but are not limited to, EDTA, EDTA salts, EDDS, EDDS salts, phosphate compounds, ascorbic acid, tetrasodium iminodisuccinate, citric acid, dicarboxymethylglutamic acid, maleic acid, diethylenetriaminepentacetic acid, cyclohexan trans-1, 2-diaminetetraacetic acid, ethanoldiglycine, diethanolglycine, hydroxyethyl-ethylene-diaminetriacetic acid, ethylene bis [2-(o-hydroxyphenyl)-glycine], nitrilotriacetic acid (NTA), a nonpolar amino acid, methionine, oxalic acid, a polar amino acid, arginine, asparagine, aspartic acid, glutamic acid, glutamine, lysine, ornithine, a siderophore, desferrioxamine B, hydrolysed wool, succinic acid, sodium metaborate, sodium silicate, sodium orthosilicate, and any mixture thereof.

In one particular embodiment, the surfactant formulation is substantially free of EDTA, EDTA salts and phosphate compounds.

According to another embodiment, the surfactant formulation comprises from about 0 to about 10 weight percent of chelant, based on the total weight of the surfactant formulation. In another embodiment, the surfactant formulation comprises from about 0.01 to about 5 weight percent of chelant, based on the total weight of the surfactant formulation. In yet another embodiment, the surfactant formulation comprises from about 0.1 to about 3 weight percent of chelant, based on the total weight of the surfactant formulation.

Examples of polymers include, but are not limited to, polyacrylamides, partially hydrolyzed polyacrylamide, polyacrylates, ethylenic copolymers, biopolymers, carboxymethylcellulose, polyvinyl alcohols, polystyrene sulfonates, polyvinylpyrrolidone, AMPS (2-acrylamide-2-methyl propane sulfonates), modified starches and mixtures thereof. Examples of ethylenic copolymers include copolymers of acrylic acid and acrylamide, acrylic acid and lauryl acetylate, lauryl acrylate and acrylamide. Examples of biopolymers include xanthan gum and guar gum.

In one embodiment, the surfactant formulation comprises from about 0 to about 2 weight percent of polymer, based on the total weight of the surfactant formulation. In another embodiment, the surfactant formulation comprises from about 0.01 to about 1 weight percent of polymer, based on the total weight of the surfactant formulation. In still another embodiment, the surfactant formulation comprises from about 0.2 to about 0.5 weight percent of polymer, based on the total weight of the surfactant formulation.

In still another embodiment, the surfactant formulation may optionally be neutralized with an alkali metal hydroxide, carbonate or chloride. In one embodiment, the alkali metal hydroxide, carbonate or chloride is added to the surfactant formulation prior to being pumped into the fossil fluid-bearing subterranean formation. In another embodiment, the surfactant formulation contains from about 0.01 weight percent to about 2 weight percent, for e.g., from about 0.05 weight percent to about 1.5 weight percent or from about 0.01 weight percent to about 1 weight percent, of alkali metal hydroxide, carbonate or chloride based on the total weight of the formulation.

The surfactant formulation may be prepared by a process of mixing the primary surfactant with the formulation stability agent and injection water. The components may be mixed together in any order using customary devices, such as, but not limited to, a stirred vessel or static mixer.

In another embodiment, there is provided a method for designing a surfactant formulation for use in recovering fossil fluids from a subterranean formation. The method includes measuring the temperature of the subterranean formation, measuring the interfacial tension in the injection water and fossil fluid, adding a primary surfactant to the injection water to decrease the interfacial tension in the injection water and fossil fluid to less than $1 \times 10^{-2}$ dynes/cm, preferably less than $0.5 \times 10_{-3}$ dynes/cm, and adding a formulation stability agent to the mixture of injection water and primary surfactant in an amount necessary to make the mixture phase stable at the temperature of the subterranean formation. In one embodiment, the injection water has a salinity of at least about 20,000 ppm and the subterranean formation is at a temperature in the range between about 80° F. to about 300° F., while in other embodiments the formation is at a temperature in the range between about 125° F. to about 300° F.

The surfactant formulation described herein may be injected into one or more injection wells located within the subterranean formation such that fossil fluid is subsequently produced from one or more producing wells. In one embodiment, the injection well and producing well are the same well. In another embodiment, the injection well and producing well are adjacent to one another. In one embodiment, the subterranean formation temperature conditions are between about 80° F. and about 300° F., preferably between about 125° F. and about 300° F.

Consideration must be given to the fact that although this disclosure has been described and disclosed in relation to certain preferred embodiments, obvious equivalent modifications and alterations thereof will become apparent to one of ordinary skill in this art upon reading and understanding this specification and the claims appended hereto. The present disclosure includes the subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim so modified. This also includes combination of the features and/or limitations of one or more of the independent claims with the features and/or limitations of another independent claim to arrive at a modified independent claim, with the remaining dependent claims in their original text being read and applied to any independent claim so modified. Accordingly, the presently disclosed invention is intended to cover all such modifications and alterations, and is limited only by the scope of the claims which follow, in view of the foregoing and other contents of this specification.

What is claimed is:

1. A surfactant formulation for treating a fossil fluid-bearing subterranean formation comprising:
   i) a primary surfactant comprising:
      a) a compound represented by the formula (I):

(I)

wherein $R^a$ is hydrogen or an alkyl group containing from 1 to 3 carbon atoms, $R^b$ is hydrogen or an alkyl group containing from 1 to 3 carbon atoms, $R^c$ is an alkyl group having from 8 to 40 carbon atoms and A is a monovalent cation,
      b) a compound represented by formula (II):

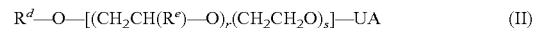

(II)

wherein $R^d$ is an alkyl group containing 6 to 30 carbon atoms, $R^e$ is $CH_3$ or $CH_2CH_3$, r is a number from 11 to 30, s is a number from 10 to 30, HU is COO and A is a monovalent cation, or
      c) a mixture thereof;
   ii) a dialkyl sulfosuccinate wherein the dialkyl sulfosuccinate is added to the surfactant formulation at a ratio of between 0.5:20 parts by weight of dialkyl sulfosuccinate to primary surfactant to about 0.5:1 parts by weight of dialkyl sulfosuccinate to primary surfactant;
   iii) a formulation stability agent selected from a booster molecule, a solvent and a mixture thereof, wherein the booster molecule has a structure shown in formula (III):

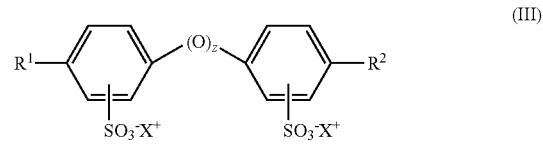

(III)

wherein z is 0 or 1, $R^1$ and $R^2$ are each independently hydrogen, an alkyl group containing 1 to 18 carbon atoms, or an aryl group, and each X is independently hydrogen, an alkali metal ion, an alkaline earth metal ion or an ammonium ion radical of the formula (IV):

(IV)

wherein each $R^3$ is independently hydrogen, an alkyl group containing 1 to 4 carbon atoms or a $C_1$-$C_4$ hydroxyalkyl radical; and
   iv) injection water.

2. The surfactant formulation according to claim 1, wherein one or both of $R^1$ and $R^2$ are an alkyl group containing 6 to 16 carbon atoms, X at each occurrence is sodium or potassium and z is 1.

3. The surfactant formulation according to claim 1, wherein the formulation stability agent is the booster molecule.

4. The surfactant formulation according to claim 3, wherein the dialkyl sulfosuccinate is a compound represented by the formula (V):

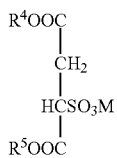

where $R^4$ and $R^5$ are each independently an alkyl group containing 5 to 13 carbon atoms and M is an alkali metal ion or an alkaline earth metal ion, an ammonium ion or a substituted ammonium ion.

5. The surfactant formulation according to claim 1, wherein the formulation stability agent is a mixture of the booster molecule and the solvent.

6. The surfactant formulation according to claim 5, wherein the solvent is a lower carbon chain alcohol or a lower carbon chain alcohol that has been alkoxylated with at least one of ethylene oxide (EO), propylene oxide (PO), and butylene oxide (BO).

7. The surfactant formulation according to claim 1, wherein the injection water is seawater, brine, fresh water from an aquifer, river or lake, or a mixture thereof.

8. The surfactant formulation according to claim 7, wherein the injection water has a salinity of at least about 20,000 ppm.

9. A process for recovering fossil fluids from a fossil fluid-bearing subterranean formation comprising injecting the surfactant formulation of claim 1 into one or more injection wells such that oil is subsequently produced from one or more producing wells.

10. The surfactant formulation according to claim 1, wherein the value of r is a number from 20 to 30 and s is a number from 10-15.

11. The surfactant formulation according to claim 10, wherein the value of r is at least two times greater than the value of s.

* * * * *